United States Patent
Asano et al.

(10) Patent No.: US 7,426,640 B2
(45) Date of Patent: Sep. 16, 2008

(54) DIGITAL WATERMARK DETECTION METHOD AND APPARATUS

(75) Inventors: Wataru Asano, Yokohama (JP); Shinichiro Koto, Machida (JP); Tomoo Yamakage, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/752,583

(22) Filed: May 23, 2007

(65) Prior Publication Data

US 2007/0217653 A1 Sep. 20, 2007

Related U.S. Application Data

(62) Division of application No. 10/626,610, filed on Jul. 25, 2003, now Pat. No. 7,284,130.

(30) Foreign Application Priority Data

Jul. 26, 2002 (JP) ............... 2002-218404

(51) Int. Cl.
*G06K 9/46* (2006.01)
(52) U.S. Cl. ............ 713/176; 382/190; 382/191
(58) Field of Classification Search ............ 380/252, 380/253, 254
See application file for complete search history.

(56) References Cited

U.S. PATENT DOCUMENTS

| 5,940,135 | A | 8/1999 | Petrovic et al. |
|---|---|---|---|
| 6,145,081 | A | 11/2000 | Winograd et al. |
| 6,175,627 | B1 | 1/2001 | Petrovic et al. |
| 6,901,515 | B1 | 5/2005 | Muratani |
| 6,952,486 | B2 | 10/2005 | Yamakage et al. |
| 7,130,443 | B1 | 10/2006 | Werner et al. |
| 2005/0094848 | A1 | 5/2005 | Carr et al. |

FOREIGN PATENT DOCUMENTS

EP  0 923 027 A2  6/1999

(Continued)

OTHER PUBLICATIONS

Bijan G. Mobasseri, et al., "Direct Sequence Watermarking of Digital Video Using m-Frames", IEEE Comput. Soc, XP010308533, vol. 2, Oct. 4, 1998, pp. 399-403.

(Continued)

*Primary Examiner*—Matthew B Smithers
(74) *Attorney, Agent, or Firm*—Oblon, Spivak, McClelland, Maier & Neustadt, P.C.

(57) ABSTRACT

A specific frequency component extraction unit extracts a specific frequency component signal from an input image signal. A phase controller controls the phase of the specific frequency component signal. A correlator computes the cross-correlation value of the phase-controlled specific frequency component signal and the input image signal. A watermark information estimation unit filters the cross-correlation value to detect watermark information embedded in the input image signal.

4 Claims, 5 Drawing Sheets

FOREIGN PATENT DOCUMENTS

| | | |
|---|---|---|
| JP | 60-68703 | 4/1985 |
| JP | 2000-236432 | 8/2000 |
| JP | 2001-527660 | 12/2001 |
| JP | 2002-185762 | 6/2002 |
| JP | 2002-519916 | 7/2002 |
| WO | WO 01/24113 A1 | 4/2001 |

OTHER PUBLICATIONS

Tae-Yun Chung, et al., "Digital Watermarking for Copyright Protection of MPEG2 Compressed Video", IEEE Transactions on Consumer Electronics, XP 011008532, vol. 44, No. 3, Aug. 1998, pp. 895-901.

Husrev T. Sencar, et al., "A Robust Type-III Data Hiding Technique Against Crooping & Resizing Attacks", IEEE International Symposium on Circuits and Systems, XP002398438, vol. 2, May 26, 2002, pp. II-444-II-447.

J.J.K. O Ruanaidh, et al., "Phase Watermarking of Digital Images", Proceedings of the International Conference on Image Processing (ICIP), XP010202375, vol. 1, Sep. 16, 1996, pp. 239-242.

DIGITAL WATERMARK DETECTION METHOD AND APPARATUS

CROSS-REFERENCE TO RELATED APPLICATIONS

The present divisional application claims the benefit of priority under 35 U.S.C. §120 to application Ser. No. 10/626,610, filed Jul. 25, 2003, and under 35 U.S.C. § 119 from Japanese Patent Application No. No. 2002-218404, filed Jul. 26, 2002, the entire contents of both are incorporated herein by reference.

BACKGROUND OF THE INVENTION

1. Field of the Invention

The present invention relates to a digital watermark detection method and apparatus useful in preventing illegal copies of a digital video signal provided via, for example, a recording medium.

2. Description of the Related Art

As apparatuses for recording and playing back digital image data, such as a digital VTR, DVD (Digital Versatile Disk), and the like have prevailed, the number of digital moving images that can be played back by these apparatuses are provided. Various digital moving images are distributed via digital television broadcast via the Internet, broadcast satellite, communication satellite, and the like, enabling users to enjoy high-quality digital moving images.

It is easy to form high-quality copies from digital moving images on the digital signal level. Therefore, if some copy protection or copy control is not applied to digital moving images, there is the danger of unrestricted formation of copies of digital images. Therefore, illicit copies of digital images must be prevented, and the number of generations of copies formed by authorized users must be restricted. For this purpose, a method of appending information for copy control to each digital moving image, and preventing illicit copies or restricting copies has been proposed.

As a technique for superposing additional information to a digital moving image in such a way, digital watermarking is known. In digital watermarking, information such as identification information of the copyright owner or user of contents, right information of the copyright owner, use conditions of contents, secret information required upon using contents, the aforementioned copy control information, or the like (such information will be referred to as watermark information hereinafter) is embedded in contents of audio data, music data, moving image data, still image data, or the like, which has been converted into digital data, so as not to be easy to perceive. By detecting the embedded watermark information from the contents later as needed, copyright protection, including use control and copy control, can be achieved, and further use of the contents is possible.

As a conventional method of digital watermarking, a method that applies a spread spectrum technique is known. In this method, watermark information is embedded in a digital moving image in the following sequence.

In step E1, an image signal undergoes spread spectrum by being multiplied by a PN (Pseudorandom Noise) sequence.

In step E2, the image signal after spread spectrum undergoes frequency transformation (e.g., DCT transformation).

In step E3, watermark information is embedded in the image signal by changing the values of specific frequency components.

In step E4, the image signal undergoes inverse frequency transformation (e.g., IDCT transformation).

In step E5, the image signal undergoes inversely spread spectrum (the image signal is multiplied by the same PN sequence as in step E1,).

Watermark information is detected in the following sequence, from the digital moving image, in which the watermark information has been embedded in the above sequence.

In step D1, the image signal undergoes spread spectrum by being multiplied by a PN (Pseudorandom Noise) sequence (the same PN sequence as in step E1,).

In step D2, the image signal after spread spectrum undergoes frequency transformation (e.g., DCT transformation).

In step D3, the embedded watermark information is extracted from the image signal while paying attention to the values of specific frequency components.

When digital watermarking is applied to digital productions for the purpose of prevention of illicit use, a characteristic (robustness) that can prevent watermark information from being lost or tampered with, and deliberate attacks which are normally carried out on digital productions must be provided to digital watermarking. As attacks that make the watermark information of a digital image impossible to detect, cut-out, scaling (enlargement/reduction), rotation, and the like of an image are known.

When an image that has suffered such attacks is input, the conventional technique recovers synchronization of a PN sequence by executing a process for estimating a PN sequence used in step E1 at the time of embedding upon detection of watermark information. After that, the processes in steps D1 to D3 are executed to extract the embedded watermark information. However, in order to recover synchronization of the PN sequence from the image signal alone, a search must be conducted by trying a process for detecting watermark information using a plurality of candidates of PN sequences and adopting a candidate that can be detected satisfactory. For this purpose, problems of increases in arithmetic operation volume and circuit scale are posed. Further, since watermark embedded in an image signal under an attack of scaling or rotation is weakened, it is very possible that the watermark cannot be detected even if the contents (scaling, rotation, etc.) of the attack is detected and a detection method corresponding to the attack is utilized.

BRIEF SUMMARY OF THE INVENTION

It is an object of the present invention to provide a digital watermark detection method and apparatus, which can mare accurately detect watermark information weakened by an attack such as scaling, rotation, etc., without increasing the operation amount and circuit scale.

According to an aspect of the invention, to detect watermark information embedded in an input image signal, firstly, a specific frequency component signal is extracted from the input image signal. The phase of the specific frequency component signal is controlled, and a cross-correlation value between the phase-controlled specific frequency component signal and the input image signal is computed. The watermark information is detected from the cross-correlation value. A correlation operation is performed to compute the cross-correlation value, while changing the phase control amount, with the result that watermark information can be detected even if the input image signal is under an attack of scaling.

According to another aspect of the invention, to detect watermark information embedded in an input image signal, firstly, the auto-correlation function of the input image signal is computed. The auto-correlation function is filtered to generate a specific frequency component signal. From this specific frequency component signal, the watermark information is detected. Before the auto-correlation function is computed, image rotation may be performed on the input image signal.

According to a further aspect of the invention, to detect watermark information embedded in an input image signal, firstly, the auto-correlation function of the input image signal is computed. The auto-correlation function is accumulated for a first period of time, thereby generating a first accumulation signal. A specific frequency component signal is extracted from the first accumulation signal, and the amplitude of the specific frequency component signal is normalized. The normalized specific frequency component signal for a second period of time longer than the first period of time, thereby generating a second accumulation signal. From the second accumulation signal, the watermark information is detected. As in the previous case, image rotation may be performed on the input image signal before the auto-correlation function is computed.

According to a further aspect of the invention, a computer readable storage medium storing instructions of a computer program which when executed by a computer results in performance of steps including: computing an auto-correlation function of the input image signal by a correlator; accumulating the auto-correlation function for a first period of time to generate a first accumulation signal by a first accumulator; extracting a specific frequency component signal from the first accumulation signal by an extraction unit; normalizing an amplitude of the specific frequency component signal by a normalizing unit; accumulating the normalized specific frequency component signal for a second period of time longer than the first period of time to generate a second accumulation signal by a second accumulator; detecting the watermark information from the second accumulation signal, wherein at least one of the correlator, the first accumulator, the normalizing unit, and the second accumulator includes a processor; and controlling, which periodically stops computation of the correlator and increases the second period of time, if the throughput is lower than a threshold value. In addition, the detecting detects the watermark information by determining a polarity of a peak of the specific frequency component signal. In addition, the detecting detects the watermark information by determining a level of the second accumulation signal using a threshold value that is changed in accordance with the second period of time. In addition, the detecting detects the watermark information using at least first and second detection manners, the detecting determining that the watermark information is embedded, if the detection results coincide with each other.

DETAILED DESCRIPTION OF THE INVENTION

Embodiments of the invention will be described in detail with reference to the accompanying drawings.

First Embodiment

A digital watermark detection apparatus according to a first embodiment of the invention receives, via a recording medium or transmission medium, an image signal having watermark information embedded therein, which is generated by a digital watermark embedding apparatus (not shown) corresponding to the digital watermark detection apparatus.

This digital watermark embedding apparatus will now be described briefly. In the digital watermark embedding apparatus, a specific frequency signal extraction unit extracts, from an original image signal, a specific frequency component, for example, a relatively high frequency component. The specific frequency component signal is subjected to phase control, performed by a phase controller in accordance with a specific phase control amount that is predetermined by digital watermark information to be embedded into an input image signal. The phase-controlled specific frequency component signal is supplied to a watermark information superposition unit formed of a digital adder, where it is superposed upon the original image signal. As a result, an image signal embedded with watermark information is generated.

The thus-obtained image signal embedded with watermark information is recorded on a recording medium by, for example, a digital image recording/reproducing apparatus, such as a DVD, or transmitted via a transmission medium, such as the Internet, a broadcasting satellite, a communication satellite, etc.

Such a digital watermark embedding apparatus as described above is disclosed in, for example, U.S. patent application Ser. No. 10/327,072, the entire contents of which are incorporated herein by reference.

Figure 1:
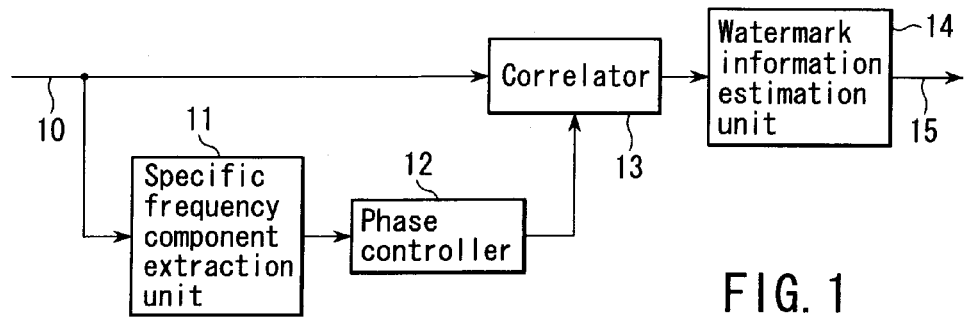
FIG. 1 is a block diagram showing a digital watermark detection apparatus according to a first embodiment of the present invention.

Referring now to FIG. 1, an input image signal 10 embedded with watermark information is supplied to the input of a specific frequency component extraction unit 11 and the first input of a correlator 13. The specific frequency component extraction unit 11 comprises a digital filter of the same frequency band as that of a specific frequency component extraction unit incorporated in the aforementioned digital watermark embedding apparatus. More specifically, the unit 11 comprises an HPF (High Pass Filter) having a specific cutoff frequency, or a BPF (Band Pass Filter) having a pass-band center frequency. The specific frequency component extraction unit 11 extracts a specific frequency component, such as a relatively high frequency component, from the input image signal 10.

Figure 2:
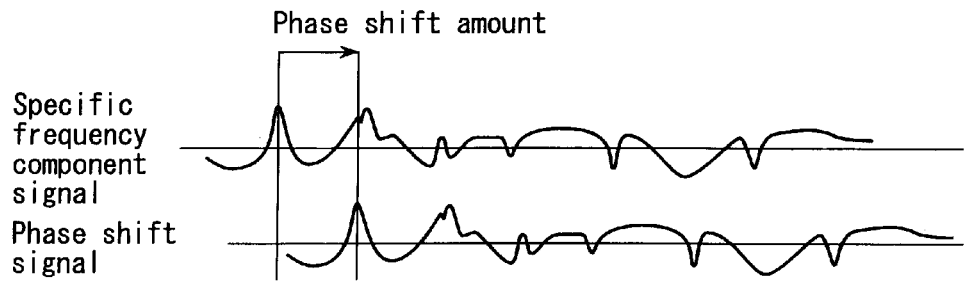
FIG. 2 is a chart for explaining phase shift of a specific frequency signal by a phase controller in the first embodiment.

The specific frequency component signal is subjected to phase control of a predetermined phase control amount by a phase controller 12, i.e., the signal is phase-shifted. The phase controller 12 is, for example, a digital phase shifter. In the phase shift example in FIG. 2 using the phase controller 12, the phase of the specific frequency component signal is shifted with its original waveform maintained. The amount of phase shift is controlled continuously or stepwise.

The phase-controlled specific frequency component signal is supplied to the first input of the correlator 13. The correlator 13 computes a cross-correlation value between the phase-controlled specific frequency component signal and the input image signal 10. The cross-correlation value is output from the correlator 13 to a watermark information estimation unit 14.

Figure 3:
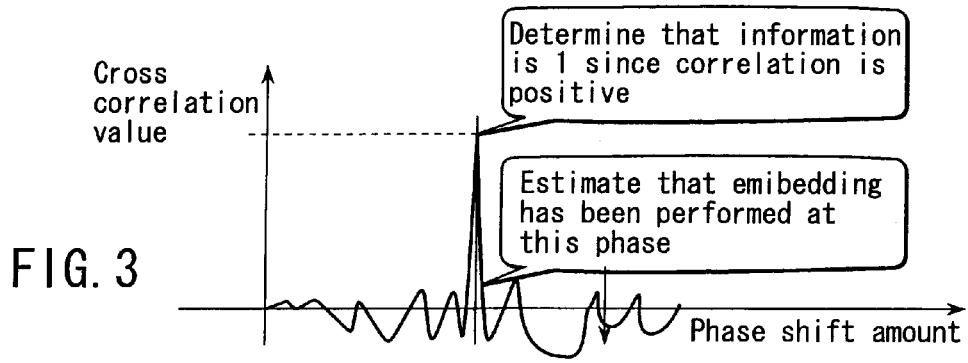
FIG. 3 is a graph showing an operation example of peak search for a cross-correlation value and watermark information detection in the digital watermark detection apparatus according to the first embodiment of the present invention.

The watermark information estimation unit 14 searches for a peak in the cross-correlation value (signal), as shown in FIG. 3, thereby detecting watermark information by estimation. In the cross-correlation value with respect to the phase shift amount of the phase controller 12, a peak appears at a certain phase-shift amount. The polarity of the peak indicates the presence of watermark information. If the input image signal 10 is under an attack of scaling, the phase shift amount of a specific frequency component contained in the input image signal 10 differs from the amount of phase shift performed on the specific frequency component by the digital watermark embedding apparatus.

In light of this, in the embodiment, the phase shift amount in the phase controller 12 is varied continuously or stepwise, thereby enabling the watermark information estimation unit 14 to search for peak in the cross-correlation value (signal) output from the correlator 13. Presence of watermark information is determined from the polarity of the peak that has been discovered. The peak in the cross-correlation value (signal) assumes a positive or negative polarity in accordance with the value between watermark information. In the example of FIG. 3, if the polarity of the peak is positive, it is determined that the watermark information assumes a value of "1", while if the polarity of the peak is negative, it is determined that the watermark information assumes a value of "0". Thus, the watermark information estimation unit 14 outputs detected watermark information 15.

As described above, in the first embodiment, a specific frequency component signal is extracted from an input image signal and subjected to phase control. The cross-correlation value between the phase-controlled specific frequency component signal and the input image signal is computed, whereby watermark information is detected from the cross-correlation value. Watermark information can be easily detected from an input image signal against which an attack of scaling was made, by searching for a peak in the cross-correlation value, while varying the amount of phase control.

Second Embodiment

Figure 4:
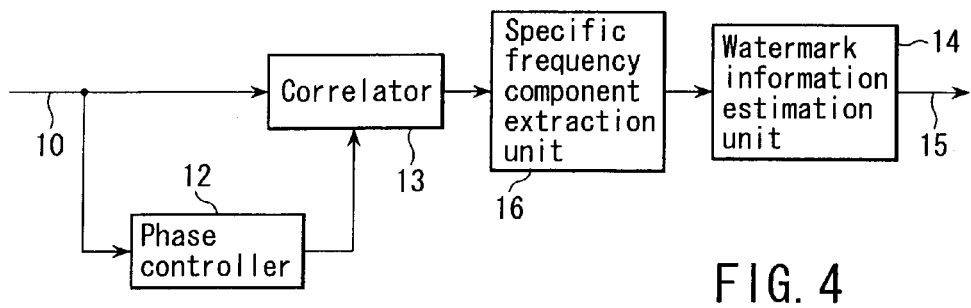
FIG. 4 is a block diagram showing a digital watermark detection apparatus according to a second embodiment of the present invention.

Referring to FIG. 4, a digital watermark detection apparatus according to a second embodiment receives, via a recording medium or transmission medium, an image signal (input image signal 10) generated by a digital watermark embedding apparatus (not shown), as in the first embodiment. The input image signal 10 is supplied to the input of the phase controller 12 and the first input of the correlator 13. The image signal subjected to phase control by the phase controller 12 is supplied to the second input of the correction unit 13, where a correlation operation is performed on the image signal and input image signal 10, thereby computing an auto-correlation function. The auto-correlation function is input to a specific frequency component extraction unit 16.

The specific frequency component extraction unit 16 comprises an HPF or a BPF, as in the specific frequency component extraction unit 11 shown in FIG. 1, and extracts a specific frequency component by filtering the auto-correlation function. The extracted specific frequency component signal is input to a watermark information estimation unit 17, where the peak level of the extracted specific frequency component signal is searched for, and the polarity of the peak level is determined.

The peak level of the extracted specific frequency component signal assumes a positive or negative polarity in accordance with the value of watermark information embedded in the input image signal 10. If the polarity of the peak level is positive, a watermark information estimation unit 17 estimates that the watermark information assumes a value of "1", while if the polarity of the peak level is negative, the unit 17 estimates that the watermark information assumes a value of "0". Thus, the watermark information estimation unit 17 outputs detected watermark information 15. If phase control by the phase controller 12, a correlation operation by the correlator 13 and filtering by the specific frequency component extraction unit 17 are linear operations, the digital watermark detection apparatus of the second embodiment is equivalent to that shown in FIG. 1.

In the second embodiment, the auto-correlation function of an input image signal is computed and filtered to generate a specific frequency component signal. Watermark information can be easily detected from an input image signal against which an attack of scaling was made, by computing the auto-correlation function of the input image signal while varying the amount of phase control with respect to the input image signal, searching for the peak level of the specific frequency component signal, and determining the polarity of the peak level.

Third Embodiment

Figure 5:
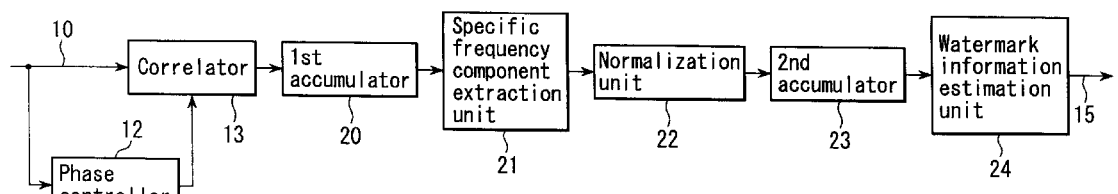
FIG. 5 is a block diagram showing a digital watermark detection apparatus according to a third embodiment of the present invention.

Referring to FIG. 5, a digital watermark detection apparatus according to a third embodiment will be described. The digital watermark detection apparatus of FIG. 5 receives, via a recording medium or transmission medium, an image signal (input image signal 10) generated by a digital watermark embedding apparatus (not shown) as in the first embodiment. The input image signal 10 is supplied to the input of the phase controller 12 and the first input of the correlator 13. The image signal subjected to phase control by the phase controller 12 is supplied to the second input of the correction unit 13, where a correlation operation is performed on the image signal and input image signal 10, thereby computing an auto-correlation function. The process so far is similar to that employed in the second embodiment.

In the third embodiment, the auto-correlation function from the correlator 13 is input to a first accumulator 20. The first accumulator 20 accumulates the auto-correlation function for a first short period of time corresponding to several lines, one field, several fields, one frame, or several frames, in which the characteristics of an image corresponding to the input image signal does not significantly change, thereby generating a first accumulation signal. The accumulator 20 is reset each time the first accumulation signal is generated, and resumes accumulation of the auto-correlation function.

The first accumulation signal is input to a specific frequency component extraction unit 21, where it is filtered. As a result, a specific frequency component signal is extracted. The specific frequency component signal is input to a normalization unit 22. The normalization unit 22 normalizes the amplitude of the specific frequency component signal so that the characteristics of the image corresponding to the input image signal 10 do not influence the detection of watermark information. The normalized specific frequency component signal is input to a second accumulator 23.

The second accumulator 23 accumulates the normalized specific frequency component signal for a second period of time, thereby generating a second accumulation signal. The second period of time is set to, for example, 15 sec., 30 sec., or 1 min., which is longer than the first period of time as the accumulation period of the first accumulator 20. The accumulator 23 is reset each time the second accumulation signal is generated, and resumes accumulation of the normalized specific frequency component signal. The second accumulation signal is input to a watermark information estimation unit 24, where the peak level of the specific frequency component signal is searched for, and the polarity of the peak level of the second accumulation signal is determined, thereby detecting watermark information 15.

In the third embodiment, the auto-correlation function of an input image signal is computed and accumulated, thereby extracting a specific frequency component signal. The specific frequency component signal is normalized in amplitude and accumulated, and watermark information is detected from the accumulated, normalized specific frequency component signal. The auto-correlation function of an input image signal is computed while varying the amount of phase control with respect to the input image signal, thereby searching for the peak level of a specific frequency component signal and determining the polarity of the peak level. By virtue of this process, watermark information can be easily detected from an input image signal against which an attack of scaling was made. In this embodiment, since the auto-correlation function is accumulated and filtered by the specific frequency component extraction unit 21, the number of filtering operations can be reduced, compared to the case where the cross-correlation value between an input image signal and a filtered image signal is accumulated. Accordingly, the cost required for detecting watermark information can be reduced without degrading the watermark information detection performance.

Fourth Embodiment

Figure 6:
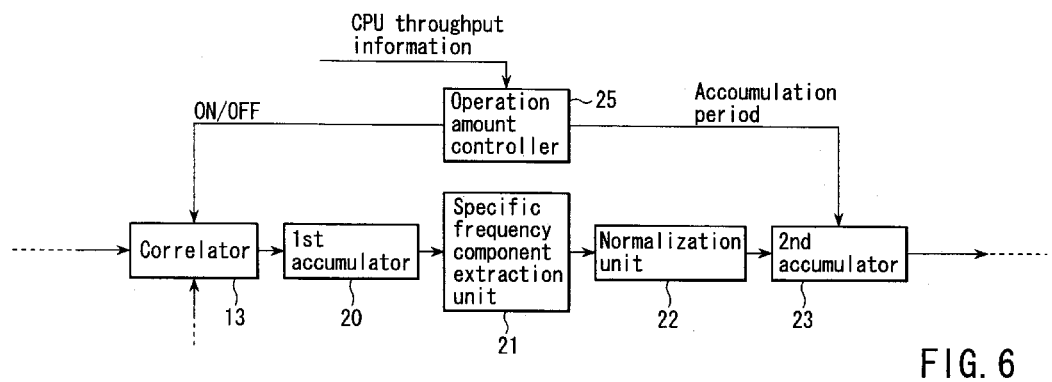
FIG. 6 is a block diagram showing an essential part of a digital watermark detection apparatus according to a fourth embodiment of the present invention.

FIG. 6 shows an essential part of a digital watermark detection apparatus according to a fourth embodiment of the invention. This digital watermark detection apparatus incorporates an operation amount controller 25, in addition to the elements employed in the digital watermark detection apparatus of FIG. 5. In this embodiment, it is assumed that part or all of the processes of the digital watermark detection apparatus is realized by software processing, using a processor, such as a versatile or dedicated CPU (Central Processing Unit), DSP (Digital Signal Processor), etc. The operation amount controller 25 acquires, from, for example, an OS (Operating System), information 26 indicative of the throughput of the processor. "Throughput" means the original performance of the processor and/or the ever-changing performance of the processor.

If the throughput of the processor is relatively low, the operation amount controller 25 controls the correlator 13 so as to reduce the operation amount of the unit 13 per unit time. Specifically, if the throughput is lower than a predetermined threshold value, the operation amount controller 25 periodically stops the operation of the correlator 13 in units of pixels, lines, fields or frames of the input image signal 10.

If the operation amount of the correlator 13 is reduced, the accumulation amount of the specific frequency component signal at the second accumulator 23 reduces. Accordingly, the watermark information detection performance degrades. To secure the accumulation amount, the operation amount controller 25 controls the accumulation period (second period) of the accumulator 23. If, for example, the correlator 13 is stopped every two lines to perform a correlation operation every two lines, the operation amount per unit time is halved, accordingly the accumulation amount of the correlation value is halved. To secure the same accumulation amount as that obtained when the operation amount of the correlator 13 is not controlled, the operation amount controller 25 doubles the accumulation period of the accumulator 23.

This enables watermark information to be detected without applying an excessive load on the processor. Therefore, watermark information detection can be realized even if a low-performance processor is used, or the processor is also used for a process other than digital watermark detection, which would drop the processor throughput below the threshold value. Conversely, if the throughput of the processor is higher than required, the frequency of stopping the correlation operation can be reduced to increase the accumulation amount and enhance the performance of watermark information detection.

Fifth Embodiment

Figure 7:
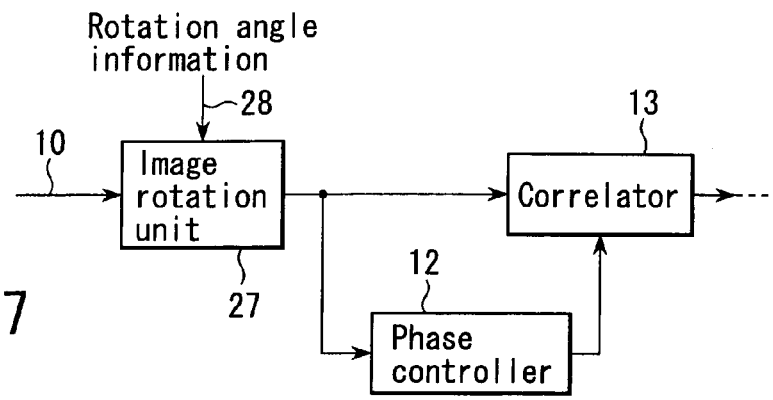
FIG. 7 is a block diagram showing an essential part of a digital watermark detection apparatus according to a fifth embodiment of the present invention.

FIG. 7 shows an essential part of a digital watermark detection apparatus according to a fifth embodiment of the invention. In the fifth embodiment, to detect a digital watermark embedded in an image signal subjected to rotational transform, an image rotation unit 27 for rotating an image corresponding to the input image signal 10 is provided before the phase controller and correlator, which differs from the third embodiment. The image rotation unit 27 outputs an image signal corresponding to an image obtained by rotating, in accordance with rotation angle information 28, the image corresponding to the input image signal 10. As a result, even if the input image signal 10 is under an attack of rotation, watermark information can be acquired therefrom.

Figure 8:
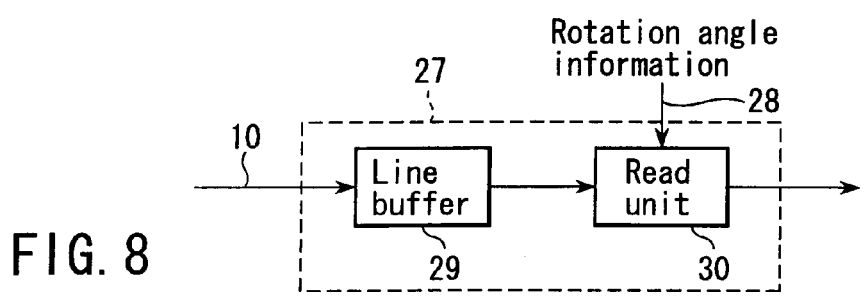
FIG. 8 is a block diagram showing an essential part of a digital watermark detection apparatus according to a sixth embodiment of the present invention.

As shown in, for example, FIG. 8, the image rotation unit 27 comprises a line buffer 29 and read unit 30. The line buffer 29 reads and temporarily stores a plurality of line components of the input image signal 10. The line components contained in the image signal stored in the line buffer 29 are read by the read unit 30, with the reading start portions of the line components being shifted to one another in accordance with the rotation angle information 28. The read unit 30 sets a line shift amount corresponding to the rotation angle information 29.

Figure 9:
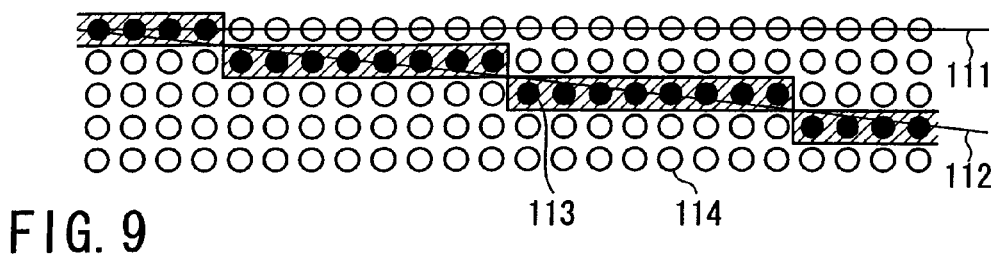
FIG. 9 is a view useful in explaining computation of correlation performed in an oblique direction to detect a digital watermark from an image subjected to rotational transform.

FIG. 9 shows the arrangement of image pixels 114 corresponding to the input image signal 10. In the correlator incorporated in a usual digital watermark detection apparatus, a correlation operation is performed in a line direction indicated by reference numeral 111. On the other hand, in this embodiment, concerning an input image signal under an attack of rotation, the image rotation unit 27 shifts each line component input to the correlator 13 in units of predetermined numbers of pixels, as indicated by reference numeral 112. As a result, image signal components, which correspond to pixels 113 expressed by black dots and arranged in an oblique direction as shown in FIG. 9, are sequentially input to the correlator 13, whereby a correlation operation is performed on the pixels in the oblique direction.

If the amount of line shifting in the read unit 30 according to the rotation angle information 28 is changed at a position corresponding to integral multiples of a predetermined number n (e.g., eight) of pixels, for example, at the position of the pixel 113 in FIG. 8, image signal data in the line buffer 29 can be effectively accessed. Accordingly, even if the input image signal 10 is under an attack of high-speed rotation, digital watermark information can be detected.

Since the rotational angle θ of an image is as small as 0 (θ≈0), cos θ≈1, sin θ≈tan θ≈θ, line shifting of an input image signal 10 under an attack of rotation input to the correlator 13, performed by the image rotation unit 27 shown in FIG. 8, enables watermark information to be detected from the input image signal without increasing the operation amount.

As described above, in this embodiment, the line components of the input image signal 10 input to the correlator 13 are gradually shifted, thereby approximating the rotation of the image. In particular, if the image rotation unit 27 comprises the line buffer 29 and read unit 30 as shown in FIG. 8, watermark information embedded in an input image signal under an attack of rotation can be detected simply by changing a read address in the read unit 30 to change the amount of line shifting. Therefore, increases in the operation amount, the memory bandwidth of the line buffer 29 and the entire circuit scale can be avoided. Furthermore, when the position at which the amount of line shifting is changed is made to correspond to the word width in the line buffer 29, the efficiency of memory access can be enhanced, therefore watermark information can be easily detected even if the input image signal 10 is under an attack of high-speed rotation.

EXAMPLE 1 OF WATERMARK INFORMATION ESTIMATION UNIT

Figure 10:
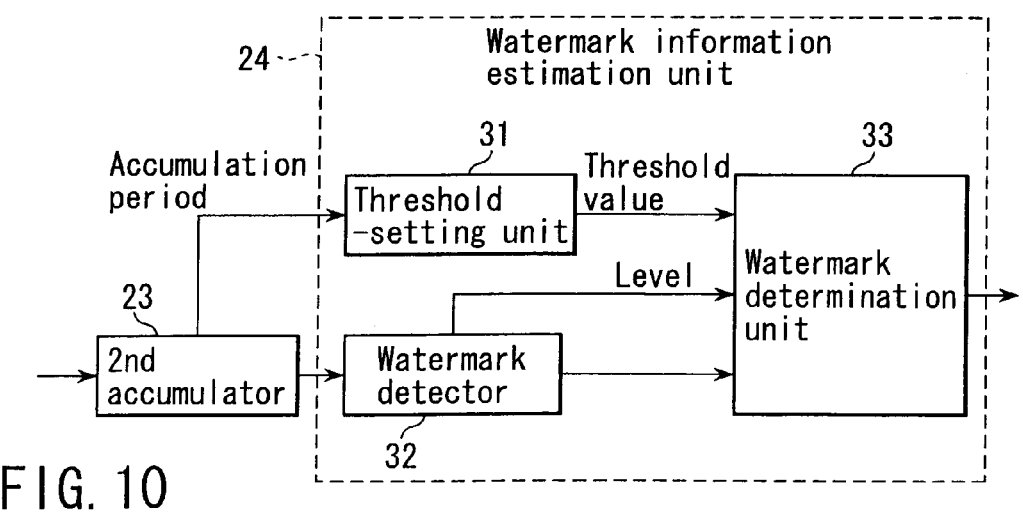
FIG. 10 is a block diagram illustrating a first concrete example of a watermark estimation unit incorporated in the digital watermark detection apparatus.
Figure 11:
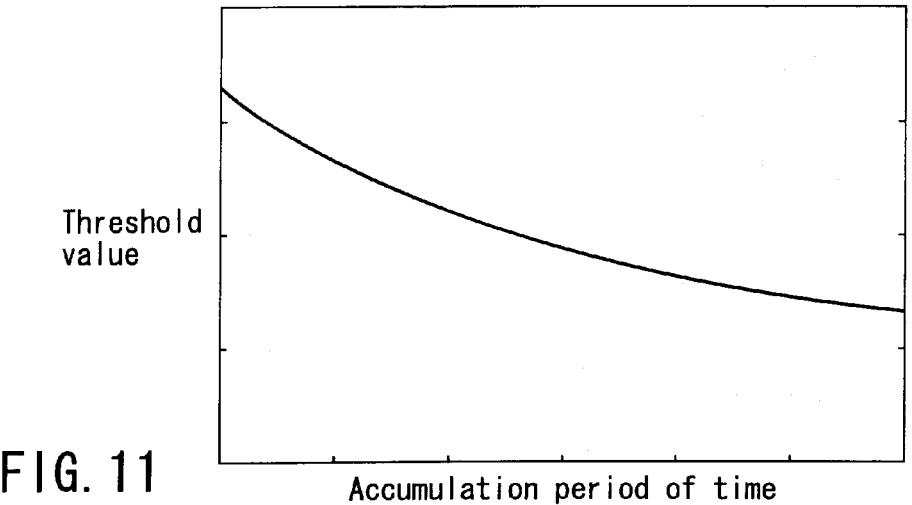
FIG. 11 is a block diagram illustrating a second concrete example of the watermark estimation unit incorporated in the digital watermark detection apparatus.

Referring to FIG. 10, a description will be given of an example of the watermark information estimation unit 24 in the digital watermark detection apparatus of FIG. 5. In this example, the watermark information estimation unit 24 comprises a threshold-setting unit 31, watermark detector 32 and watermark determination unit 33.

The threshold-setting unit 31 acquires information indicative of a second period of time corresponding to the accumulation period of time of the second accumulator 23 shown in FIG. 5, thereby changing, based on the accumulation period, the threshold value set in the watermark determination unit 33 for determining watermark information. Specifically, the longer the accumulation period, the lower the threshold value is set. The watermark detector 32 detects watermark information from a second accumulation signal (obtained by normalizing and accumulating the specific frequency component of an auto-correlation signal) output from the second accumulator 23, thereby providing the watermark determination unit 33 with the detected watermark information and level (the absolute value of the amplitude of the peak of the second accumulation signal).

The watermark determination unit 33 compares the level supplied from the watermark detector 32 with the threshold value set by the threshold-setting unit 31. If the level is not less than the threshold value, the watermark determination unit 33 determines that the watermark detector 32 has correctly detected watermark information, and outputs the detected watermark information. If, on the other hand, the level is less than the threshold value, the watermark determination unit 33 determines that no watermark information is embedded, and outputs a message "No Watermark". As mentioned above, basically, the longer the accumulation period, the lower the threshold value. However, the threshold value may also be set higher. The watermark determination unit 33 may perform determination in units of predetermined periods (e.g., 15 sec., 30 sec., one minute, etc.) using a threshold value corresponding to the period, or may perform determination using a continuously varied threshold value.

As described above, in the embodiment, when the accumulation period is set long, the threshold value for determining watermark information is lowered to increase the probability of detection of watermark information. Accordingly, the detection performance is enhanced without increasing the operation amount or circuit scale required for the detection of watermark information.

EXAMPLE 2 OF WATERMARK INFORMATION ESTIMATION UNIT

Figure 12:
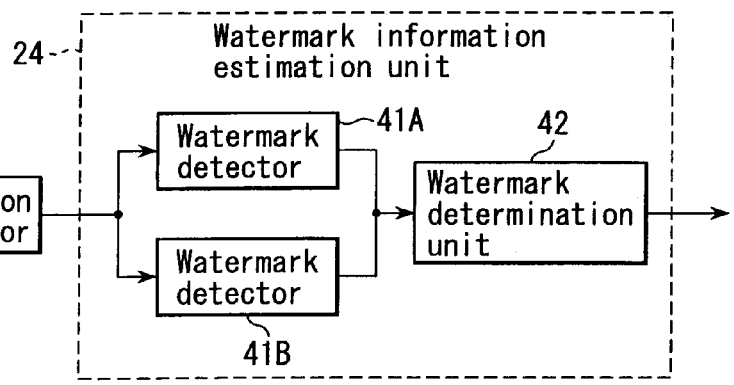
FIG. 12 is a block diagram illustrating a third concrete example of the watermark estimation unit incorporated in the digital watermark detection apparatus.

Referring to FIG. 12, a description will be given of another example of the watermark information estimation unit 24 in the digital watermark detection apparatus of FIG. 5. In this example, the watermark information estimation unit 24 comprises at least two watermark detectors 41A and 41B that employ different watermark detection manners, and watermark determination unit 42. The watermark detectors 41A and 41B individually detect watermark information. The watermark determination unit 42 determines whether the detection results of the detectors 41A and 41B are identical to each other.

The watermark detector 41A receives a second accumulation signal output from the accumulator 23 and indicative of the normalized and accumulated specific frequency component of an auto-correlation signal, then detects watermark information from the second accumulation signal using a first detection manner, and supplies the detection result to the watermark determination unit 42. Similarly, the watermark detector 41B detects watermark information from the second accumulation signal using a second detection manner, and supplies the detection result to the watermark determination unit 42. The watermark determination unit 42 compares the watermark information items from the watermark detectors 41A and 41B. If they are identical, the watermark determination unit 42 determines that digital watermark has been detected, and outputs the detected watermark information. If they are not identical, the unit 42 determines that no digital watermark is embedded, and outputs a message "No Watermark".

If, for example, the watermark detector 41A has detected watermark information "A" using the first detection manner, and the watermark detector 41B has detected watermark information "A" using the second detection manner, the two detection results are identical and hence watermark information "A" is finally acquired as a detection result. On the other hand, if watermark information items "B" and "C" are acquired by the first and second detection manners, respectively, the two detection results differ from each other and hence watermark information cannot be confirmed, with the result that it is determined that no watermark information is embedded. The same idea as that of this embodiment can be utilized when three or more detection manners are employed.

As stated above, the embodiment employs comparison of watermark information items obtained using a plurality of detection manners, which enables accurate detection of watermark information and reduction of the probability of erroneous detection.

EXAMPLE 3 OF WATERMARK INFORMATION ESTIMATION UNIT

Figure 13:
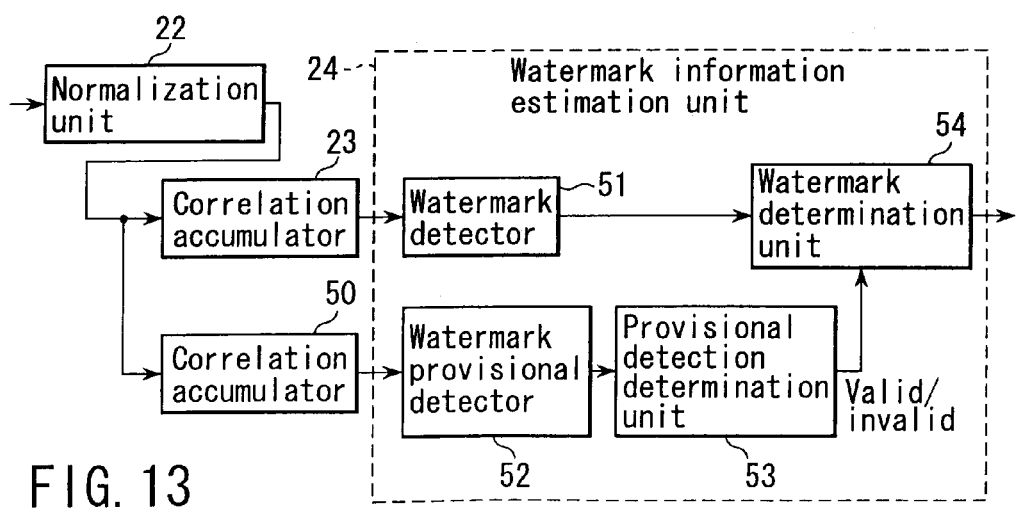
FIG. 13 is a view illustrating a determination threshold value for watermark information detection, which are changed in accordance with an accumulation period of time.

Referring to FIG. 13, a description will be given of a further example of the watermark information estimation unit 24. In this example, in addition to the second accumulator 23 shown in FIG. 5, a third accumulator 50 is provided before the watermark information estimation unit 24 for accumulating the normalized specific frequency component of an auto-correlation signal. Further, the watermark information estimation unit 24 comprises a watermark detector 51, watermark provisional detector 52, provisional detection determination unit 53 and watermark determination unit 54.

The second accumulator 23 accumulates a normalized specific frequency component signal for the second period of time, and supplies a second accumulation signal to the watermark detector 51. The watermark detector 51 detects watermark information, and supplies a detection result to the watermark determination unit 54. The third accumulator 50 accumulates the normalized specific frequency component signal for a third period of time that is 1/n (n: an integer higher than 1) of the second period, and outputs an accumulation signal to the watermark provisional detector 52.

The watermark provisional detector 52 performs provisional detection of watermark information, and outputs a provisional detection result to the provisional detection determination unit 53. After the provisional detection determination unit 53 accumulates a number n of provisional detection results, and compares them, it supplies the watermark determination unit 54 with a determination result indicative of whether or not more than half of the number n of provisional detection results are identical to each other.

If the watermark determination unit 54 receives, from the provisional determination unit 53, a determination result indicating that more than half of the number n of provisional detection results are identical, it determines that watermark information has been detected, and outputs the watermark information supplied from the watermark detector 51. On the other hand, if the watermark determination unit 54 receives, from the provisional determination unit 53, a determination result indicating that not more than half of the number n of provisional detection results are identical, it determines that no watermark information is embedded, and outputs a message "No Watermark".

Specifically, if the detection period of the watermark provisional detector 52 is 10 sec. and n=2, it is determined that watermark information "A" has been provisionally detected within the first five seconds, and has also provisionally been detected within the last five seconds. In this case, since more than half of the provisional detection results are identical to each other, the detection results are determined to be valid. As a result, the provisional detection determination unit 53 determines that watermark information is embedded, and the watermark detector 51 outputs the detected watermark information. On the other hand, if it is determined that watermark information "B" has been provisionally detected within the first five seconds, and watermark information "C" has been provisionally detected within the last five seconds, more than half of the provisional detection results are not identical to each other, thereby determining that the detection results are invalid. As a result, it is determined that no watermark information is embedded.

As described above, in the embodiment, temporal continuity of watermark information is estimated, which enables watermark information to be correctly detected, i.e., enables the probability of erroneous detection of watermark information to be reduced.

(Re: Correlator)

A detailed description will now be given of the correlator 13 incorporated in the above-described digital watermark detection apparatuses. In general, a correlation operation means to sum up the multiplication results of corresponding pixel values contained in certain signals X(n) and Y(n). The cross-correlation value (correlation coefficient) C of the certain signals X(n) and Y(n) is given by the following equation (1):

$$C = \sum_{n=0}^{l-1} X(n) \times Y(n) \quad (1)$$

where l represents a signal length. In the case of auto-correlation, Y(n)=X(n).

Figure 14:
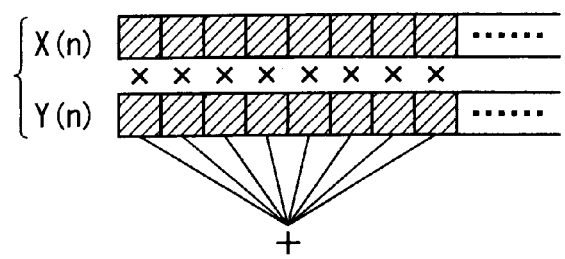
FIG. 14 is a view illustrating a general correlation operation.
Figure 15:
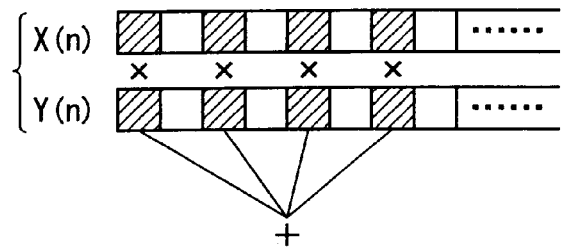
FIG. 15 is a view illustrating a correlation operation performed on every other pixel.

FIG. 14 is a view useful in explaining a general correlation operation. In this operation, multiplication and addition are performed a number of times corresponding to the number of pixels, therefore a large number of operations are required. To reduce the number of operations, thinning of pixel values is performed. For example, a block, on which multiplication and addition are performed, and a block, on which these operations are not performed, are switched in units of numbers of pixels n, thereby reducing the operation amount (to, for example, 1/n of the conventional one). As a result, the accuracy of a correlation coefficient is reduced, but is still sufficient for the detection of watermark information. Thus, the operation amount can be effectively reduced. Specifically, if multiplication and addition are performed concerning every other pixel as shown in FIG. 15, the correlation coefficient C is given by $$C = \sum_{n=0}^{l-1} \begin{cases} X(n) \times Y(n) & \text{if } n = \text{even} \\ 0 & \text{else} \end{cases} \quad (2)$$

The pixel, on which multiplication is performed, and the pixel, on which multiplication is not performed, are exchangeable. As a result, the number of operations is half that conventionally required.

Figure 16:
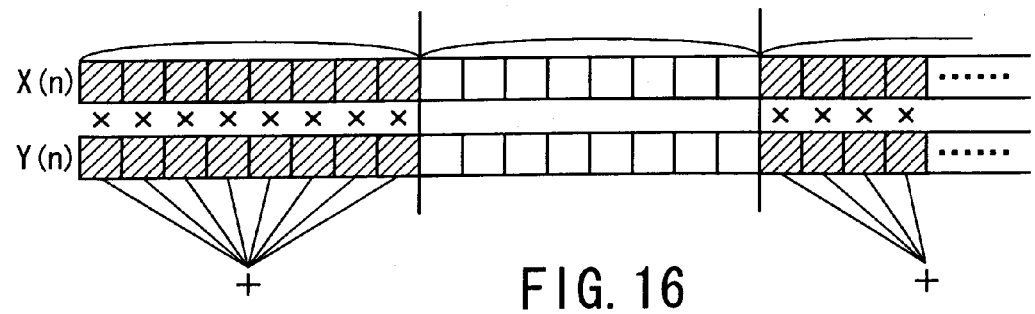
FIG. 16 is a view illustrating a correlation operation performed on eight pixels contained in every other block.

Alternatively, multiplication and addition may be performed for the first eight pixels, and not for the next eight pixels, as is shown in FIG. 16. If this operation is repeated, the correlation coefficient C is given by $$C = \sum_{n=0}^{l-1} \begin{cases} X(n) \times Y(n) & \text{if } n/8 = \text{even} \\ 0 & \text{else} \end{cases} \quad (3)$$

Also in this case, the pixel, on which multiplication is performed, and the pixel, on which multiplication is not performed, are exchangeable. As a result, the operation amount is half that conventionally required.

Figure 17:
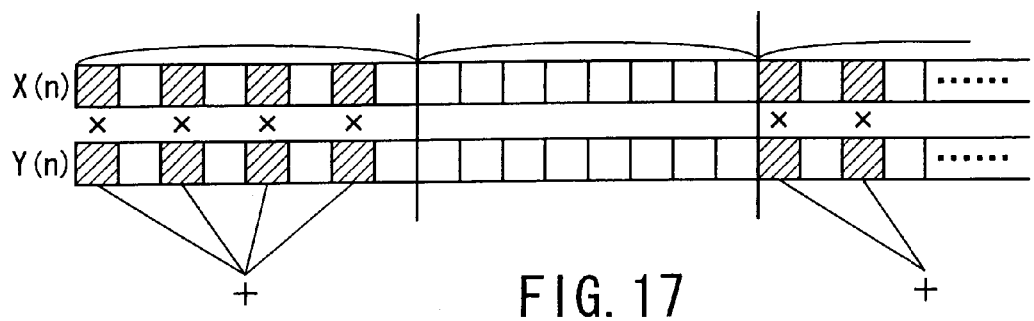
FIG. 17 is a view illustrating a correlation operation performed on every other pixels contained in every other block.

Further, the operation may be modified as shown in FIG. 17 and as given by formulas (2) and (3), where multiplication and addition are performed concerning every other pixel of the first eight pixels, but not performed concerning the next eight pixels. In this case, the correlation coefficient C is given by the following formula (4), and the operation amount is ¼ of the conventional one.

$$C = \sum_{n=0}^{l-1} \begin{cases} X(n) \times Y(n) & \text{if } n/8 = \text{even } \& \ n = \text{even} \\ 0 & \text{else} \end{cases} \quad (4)$$

As described above, by performing the correlation operation with pixel values thinned, the operation amount and circuit scale required for it can be effectively reduced without degrading the detection performance of watermark information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer readable storage medium storing instructions of a computer program which when executed by a computer results in performance of steps comprising:
   computing an auto-correlation function of the input image signal by a correlator;
   accumulating the auto-correlation function for a first period of time to generate a first accumulation signal by a first accumulator;
   extracting a specific frequency component signal from the first accumulation signal by an extraction unit;
   normalizing an amplitude of the specific frequency component signal by a normalizing unit;
   accumulating the normalized specific frequency component signal for a second period of time longer than the first period of time to generate a second accumulation signal by a second accumulator;
   detecting the watermark information from the second accumulation signal,
   wherein at least one of the correlator, the first accumulator, the normalizing unit, and the second accumulator includes a processor; and
   controlling, which periodically stops computation of the correlator and increases the second period of time, if the throughput is lower than a threshold value.

2. The computer readable storage medium according to claim 1, wherein the detecting detects the watermark information by determining a polarity of a peak of the specific frequency component signal.

3. The computer readable storage medium according to claim 1, wherein the detecting detects the watermark information by determining a level of the second accumulation signal using a threshold value that is changed in accordance with the second period of time.

4. The computer readable storage medium according to claim 1, wherein the detecting detects the watermark information using at least first and second detection manners, the detecting determining that the watermark information is embedded, if the detection results coincide with each other.

* * * * *